United States Patent
Hecht (10) Patent No.: US 8,678,716 B2
(45) Date of Patent: Mar. 25, 2014

(54) CUTTING TOOL ASSEMBLY WITH REMOVABLE TOOL HEAD

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 149 days.

(21) Appl. No.: 13/450,711

(22) Filed: Apr. 19, 2012

(65) Prior Publication Data

US 2013/0279995 A1  Oct. 24, 2013

(51) Int. Cl.
*B23B 27/16* (2006.01)
*B23B 29/12* (2006.01)

(52) U.S. Cl.
USPC .............................................. 407/33; 407/46

(58) Field of Classification Search
USPC .................. 407/33, 36, 46, 77, 101
See application file for complete search history.

(56) References Cited

U.S. PATENT DOCUMENTS

| | | | |
|---|---|---|---|
| 3,289,273 A | 12/1966 | Artaud | |
| 3,500,523 A | 3/1970 | Cashman et al. | |
| 4,057,884 A | 11/1977 | Suzuki | |
| 4,066,376 A | 1/1978 | Eckle et al. | |
| 5,555,784 A | 9/1996 | Muendlein et al. | |
| 6,004,080 A * | 12/1999 | Qvarth et al. | 407/36 |
| 6,280,122 B1 * | 8/2001 | Qvarth | 407/36 |
| 6,702,526 B2 | 3/2004 | Gamble et al. | |
| 7,086,812 B2 | 8/2006 | Gamble et al. | |
| 7,118,311 B2 * | 10/2006 | Astrom | 407/46 |
| 7,240,593 B2 | 7/2007 | Little | |
| 7,578,640 B2 | 8/2009 | Hecht | |
| 8,475,087 B2 * | 7/2013 | Wihlborg et al. | 407/46 |
| 2010/0254774 A1 | 10/2010 | Hecht | |

FOREIGN PATENT DOCUMENTS

JP  2001 328012 A  11/2001

OTHER PUBLICATIONS

International Search Report dated Jul. 26, 2013 issued in PCT counterpart application (No. PCT/IL2013/050273).

* cited by examiner

*Primary Examiner* — Will Fridie, Jr.
(74) *Attorney, Agent, or Firm* — Womble Carlyle (57) ABSTRACT

A cutting tool assembly has a tool holder, a tool head and a tool head fastening member. The tool holder includes holder front and top ends, with a holder mating surface extending therebetween. A holder clamping portion is located rearwards from the holder mating surface. The tool head has a tool head bottom end provided with a tool head mating surface. A tool head clamping recess extends upwards from the tool head bottom end, rearwards from the tool head mating surface. In an assembled position of the cutting tool assembly, the tool head mating surface forms a dovetail connection with the holder mating surface, and the tool head fastening member clamps the tool head clamping recess, thereby externally clamping the tool head to the tool holder.

33 Claims, 7 Drawing Sheets

CUTTING TOOL ASSEMBLY WITH REMOVABLE TOOL HEAD

FIELD OF THE INVENTION

The present invention relates to cutting tool assemblies, for metal cutting processes in general, and to cutting tool assemblies with a removable tool head for holding a cutting insert employed in turning and grooving operations, in particular.

BACKGROUND OF THE INVENTION

Cutting tools may have a holder and a releasable tool head with an insert pocket for holding a cutting insert. The cutting insert is usually formed of a hard material, such as cemented carbide. The releasable tool head is removably attached to the holder, by an attachment element. Such attachment element is usually a screw which passes through a pre-formed through hole in the releasable tool head and engages a corresponding threaded hole formed in the holder body. Examples of such cutting tools are disclosed in U.S. Pat. Nos. 3,289,273, 3,500,523, 4,057,884, 4,066,376, 5,555,784, 6,702,526, 7,086,812, 7,118,311, 7,240,593, 7,578,640 and US2010/0254774.

It is an object of the subject matter of the present application to provide an improved novel cutting tool assembly with a removable tool head for holding a cutting insert, wherein the tool head does not require a through hole for clamping to the holder.

SUMMARY OF THE INVENTION

In accordance with the subject matter of the present application, there is provided a cutting tool assembly, comprising
 a tool holder having a longitudinal holder axis extending in a rearward to forward direction, the tool holder including a holder front end, a holder top end, a holder mating surface extending therebetween, and a holder clamping portion spaced apart in the rearward direction from the holder mating surface;
 a tool head having a longitudinal tool head axis extending in the rearward to forward direction, a tool head bottom end provided with a tool head mating surface, and a tool head clamping recess extending upwards from the tool head bottom end, and spaced apart in the rearward direction from the tool head mating surface; and
 a tool head fastening member;
 wherein in an assembled position of the cutting tool assembly:
  the tool head mating surface forms a dovetail connection with the holder mating surface; and
  the tool head fastening member clamps the tool head clamping recess, thereby externally clamping the tool head to the tool holder.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the present invention. However, it will also be apparent to one skilled in the art that the subject matter of the present invention can be practiced without the specific configurations and details presented herein.

Figures 1, 2:
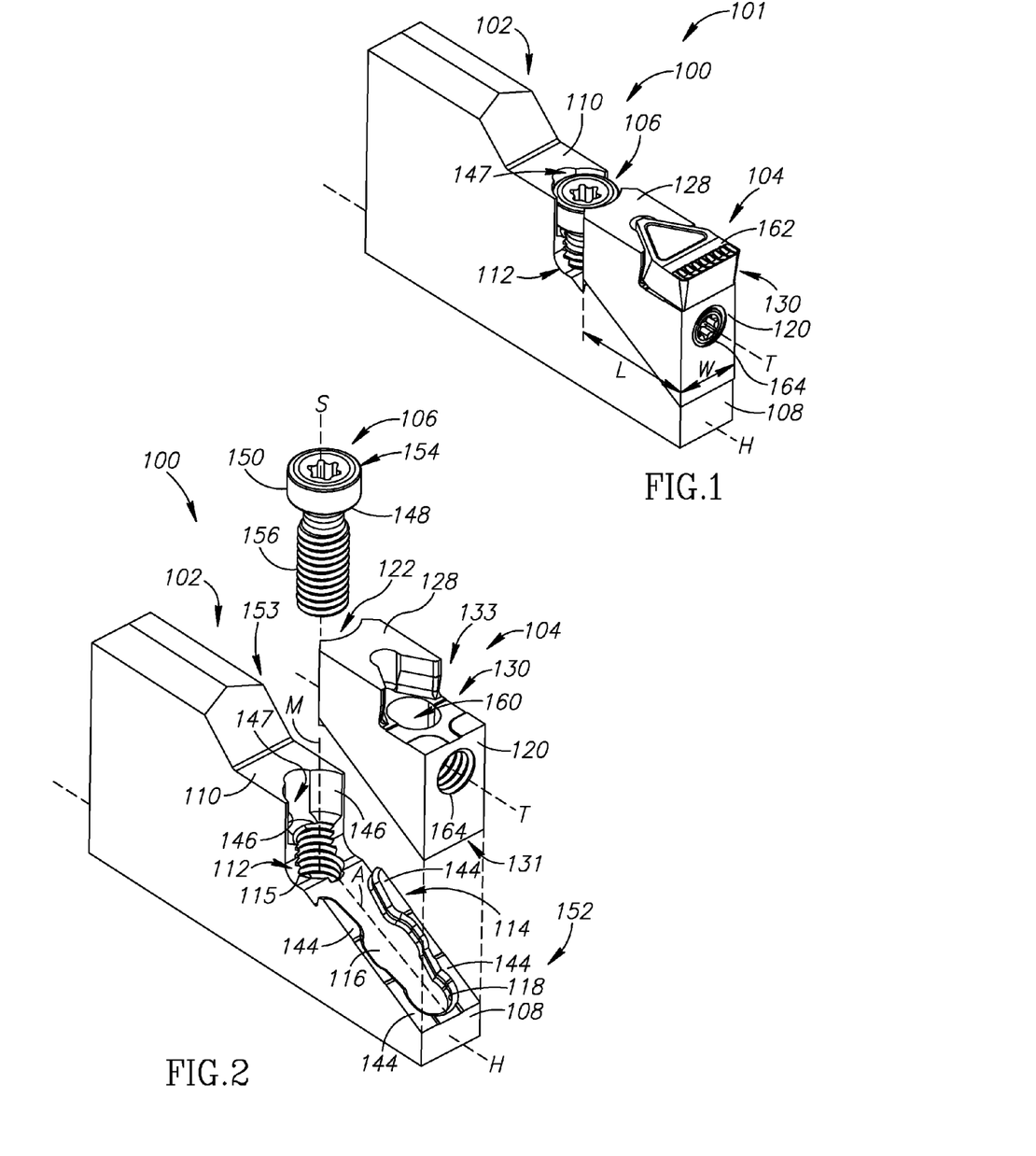
FIG. 1 is a perspective view of a cutting tool, in accordance with an embodiment of the disclosed technique, in an assembled position.
FIG. 2 is a perspective view of a cutting tool assembly of the cutting tool of FIG. 1, in a disassembled position.

Attention is first drawn to FIG. 1 depicting a cutting tool 101 according to an embodiment of the present invention, in an assembled position. The cutting tool 101 comprises a cutting tool assembly 100 and a cutting insert 162. The cutting tool assembly 100 comprises a tool holder 102, a removable tool head 104, and a tool head fastening member 106 for firmly clamping the removable tool head 104 to the tool holder 102. The tool head 104 has an insert pocket 130, for holding the cutting insert 162, during metal cutting operations (e.g., turning or grooving).

Reference is further made to FIG. 2, which is a perspective view of the cutting tool assembly 100 of the cutting tool 101 of FIG. 1, in a disassembled position. The tool holder 102 has a longitudinal holder axis H extending in a rearward $D_R$ to forward $D_F$ direction. The tool holder 102 has a front end 152 with a holder front surface 108 extending in the upward-downward direction U, D (i.e., substantially perpendicular to the holder axis H), and a holder top end 153 with a holder top surface 110, extending substantially parallel to the holder axis H. A holder mating surface 114 extends between the holder front end 152 and the holder top end 153, and a holder clamping portion 112 is formed rearwards of the holder mating surface 114.

The holder clamping portion 112 extends along a clamping axis M, and has a threaded bore 115 and at least one forward-facing holder support surface 146. According to some embodiments, the clamping axis M extends perpendicular to the holder axis H. The holder support surfaces 146 are located upwards from the threaded bore 115, along the clamping axis M. According to some embodiments of the present invention (e.g., FIGS. 1 and 5), the holder clamping portion 112 includes two holder support surfaces 146. The two holder support surfaces 146 lie on a common substantially circular arc 158, the center of which is on the clamping axis M, but are separated by a rearwards release recess 147. According to another embodiment of the disclosed technique (e.g., FIG. 14), the holder clamping portion 112 includes a single support surface 146, lying on a unitary circular arc 158, with no release recess 147.

The removable tool head 104 has a longitudinal tool head axis T extending in the rearward to forward directions $D_R$, $D_F$, and a tool head bottom end 131 having a tool head mating surface 132. The tool head 104 includes a tool head front surface 120 and an opposite tool head rearward surface 122, both extending in the upward to downward direction U, D. The tool head front and rearward surfaces 120, 122 are distanced by a tool head length L (FIG. 2).

The tool head rearward surface 122 has an external tool head clamping recess 124, extending upwards from the tool head bottom end 131. According to some embodiments, the tool head clamping recess 124 extends perpendicular to the tool head axis T. The tool head clamping recess 124 includes a clamping surface 126, extending from the tool head rearward surface 122. The tool head 104 includes a tool head top end 133, provided with a tool head top surface 128 extending from the tool head rearward surface 122, towards the insert pocket 130. As seen in the figures, the external tool head clamping recess 124 extends upwards from the tool head bottom end 131 to the tool head top end 133.

The holder mating surface 114 includes a beveled female portion 116, partially limited by a plurality of holder mating sidewalls 140. According to some embodiments, the holder mating sidewalls 140 may be connected by a unitary holder sidewall 118, which diverges towards the holder clamping portion 112 (i.e., in the rearward direction $D_R$).

The tool head mating surface 132 includes a male portion 134 projecting therefrom, partially limited by a plurality of tool head mating sidewalls 138. According to some embodiments, the tool head mating sidewalls 138 are connected by a unitary tool head sidewall 136, which diverges towards the tool head clamping recess 124.

Figure 3:
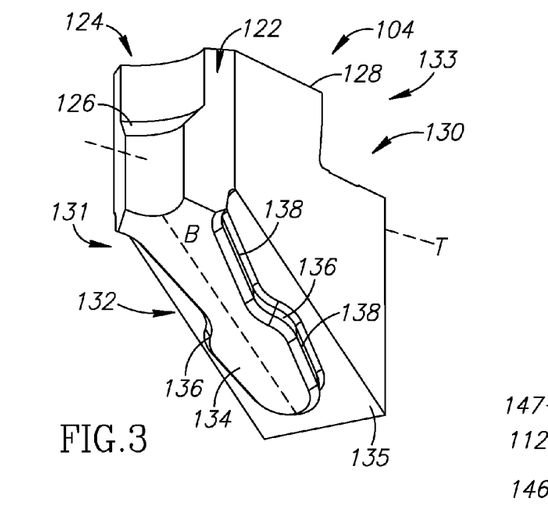
FIG. 3 is a bottom perspective view of a removable tool head of the cutting tool assembly of FIG. 2.
Figure 4:
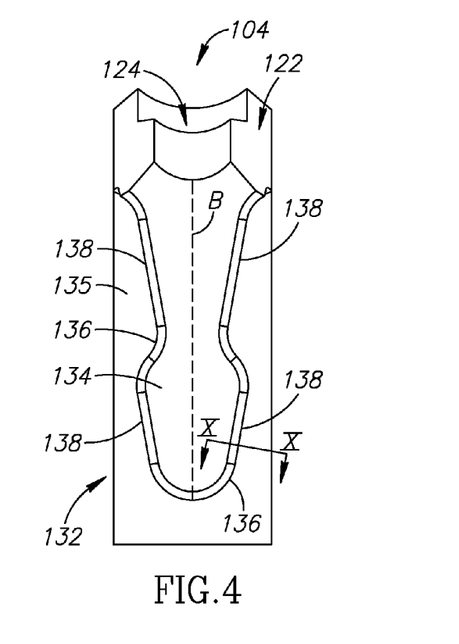
FIG. 4 is a bottom plan view of the head mating surface of the removable tool head of FIG. 3.
Figure 5:
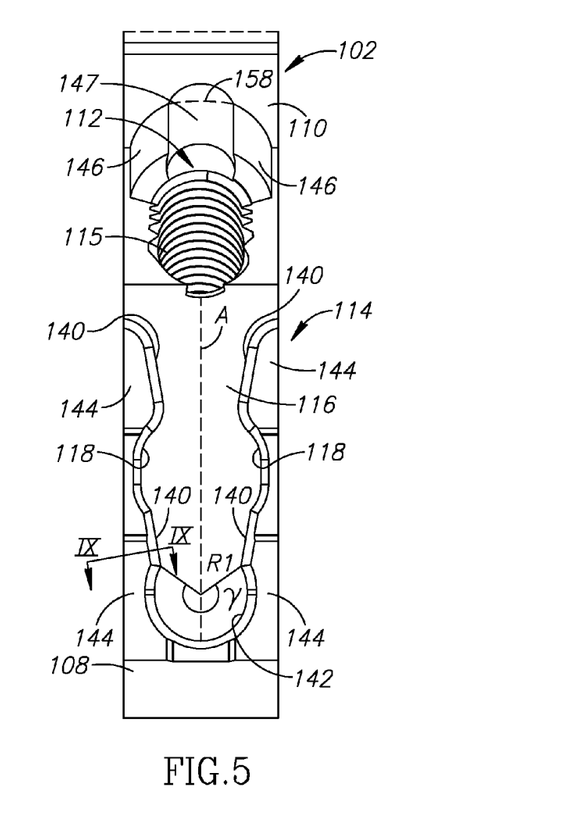
FIG. 5 is a plan view of the holder mating surface of the tool holder of the cutting tool assembly of FIG. 2.

Reference is further made to FIGS. 3-5. In a respective plan view of the holder and tool head mating surfaces 114, 132, the holder and tool head mating sidewalls 140, 138 exhibit mirror symmetry relative to a holder and a tool head mating axes A, B, respectively. The holder mating axis A is located along the female portion 116, and the tool head mating axis B is located along the male portion 134. The holder mating sidewalls 140 are transverse to the holder mating axis A, diverging away from the holder mating axis A towards the holder clamping portion 112. Similarly, the tool head mating sidewalls 138 are transverse to the tool head mating axis B, diverging away from the tool head mating axis B towards the tool head clamping recess 124.

A tool head abutment surface 135 extends on the tool head mating surface 132, adjacent to the tool head mating sidewalls 138, substantially parallel to the male portion 134. The tool head mating sidewalls 138 conform in shape, size and orientation, to the holder mating sidewalls 140, in order to allow firm abutment between the mating sidewalls 138, 140 in the assembled position.

Figure 8:
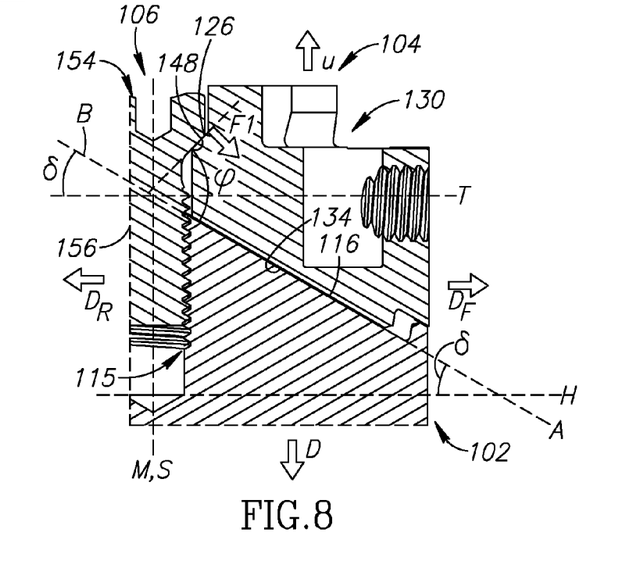
FIG. 8 is a cross sectional view of the cutting tool assembly of FIG. 6, according to the line VIII-VIII.

The holder mating surface 114 and the tool head mating surface 132 are tilted by a tilt angle δ relative to the holder axis H and the tool head axis T, respectively (as indicated in FIG. 8). The tilt angle δ is an acute angle, typically in the range of 0-60°. It is noted that by being positioned in this tilt, the holder and tool head mating surfaces 114, 132 may be positioned substantially perpendicular to the direction of an operational force, applied on the tool head 104 through a cutting edge of the cutting insert 162, during chip removing operations (i.e., metal cutting operations). Thereby, the cutting tool assembly 100 withstands various operational forces, reducing the possibility of breakage of the holder and the tool head mating surfaces 114, 132.

With further reference to FIGS. 4 and 5, the holder mating surface 114 also includes at least three coplanar holder abutment surfaces 144, located adjacent to the holder mating sidewalls 140. The holder abutment surfaces 144 are elevated relative to the holder mating surface 114, in a direction perpendicular to the holder mating surface 114. According to some embodiments, the holder mating surface 114 includes four spaced apart coplanar holder abutment surfaces 144, as indicated in FIG. 5.

FIGS. 4 and 5 depict plan views of the tool head and holder mating surfaces 132, 114, respectively. These plan views are taken perpendicular to the tool head and holder abutment surfaces 135, 144, respectively. According to some embodiments of the invention, the tool head and the holder mating sidewalls 138, 140, are substantially linear, when viewed in the respective plan view of the mating surfaces 132, 114.

Figure 9:
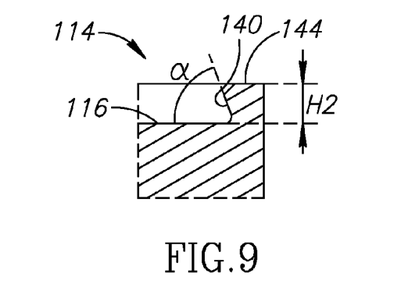
FIG. 9 is a cross sectional view of the tool holder of FIG. 5, according to the line IX-IX.
Figure 10:
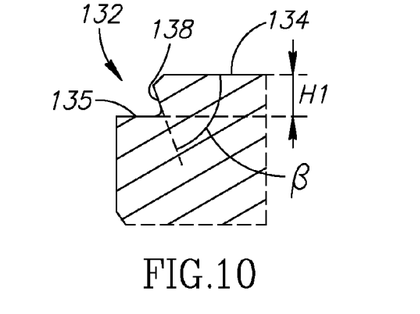
FIG. 10 is a cross sectional view of the tool head of FIG. 4, according to the line X-X.

Reference is further made to FIGS. 9 and 10, depicting a portion of the holder and tool head mating surfaces 114, 132 in cross sections along the respective cutting lines IX-IX and X-X (indicated in FIGS. 5 and 4, respectively). The cross section of FIG. 9 is taken perpendicular to one of the holder mating sidewall 140 of the holder mating surface 114. The cross section of FIG. 10 is taken perpendicular to one of the tool head mating sidewalls 140 of the tool head mating surface 132. The female portion 116 forms an acute holder dovetail angle α with the holder mating sidewall 140, while the male portion 134 forms an acute tool head dovetail angle β with the tool head mating sidewall 138. In a preferred embodiment of the present invention, the holder dovetail angle α is the same as the tool head dovetail angle β, in order to provide a tight dovetail connection between the tool head mating surface 132 and the holder mating surface 114.

The male portion 134 is substantially parallel to the tool head abutment surface 135, and spaced apart therefrom by a first distance H1. The female portion 116 is substantially parallel to the holder abutment surface 144, and spaced apart therefrom by a second distance H2. In a preferred embodiment of the present invention, the second distance H2 is the same as, or greater than the first distance H1, in order for the tool head abutment surface 135 to abut the holder abutment surfaces 144, when the male portion 134 is received within the female portion 116.

With further reference to FIGS. 3-5, according to some embodiments of the disclosed technique, the unitary holder sidewall 118 may include, at a front end thereof, a convergence circular portion 142, having a radius R1 and subtending a circular end angle γ. The convergence circular portion 142 may be a result of the manufacturing of the beveled female portion 116, and is not necessarily required for the disclosed invention.

The tool head fastening member 106 is a fastening screw, having a substantially circular head portion 154 and an narrower elongated threading portion 156, extending from the head portion 154 along a screw axis S. The head portion 154 has a head clamping surface 148, facing towards the elongated fastening portion 156, and a fastening support surface 150, extending circumferentially on the head portion 154.

The cutting tool assembly 100 can be moved from a disassembled position (FIG. 2) to an assembled position (FIG. 1). In order to assemble the cutting tool assembly 100, the tool head 104 is placed on the tool holder 102, such that the tool head mating surface 132 is located on the holder mating surface 114. The male portion 134 is then fitted into the female portion 116. In this position, the tool head clamping recess 124 is aligned with the holder clamping portion 112, and the clamping surface 126 faces the holder support surfaces 146.

Figure 6:
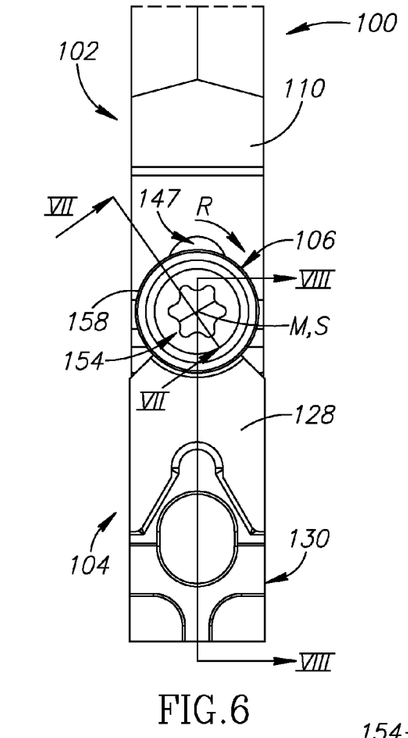
FIG. 6 is a top view of the cutting tool assembly of FIG. 2, in an assembled position.
Figure 7:
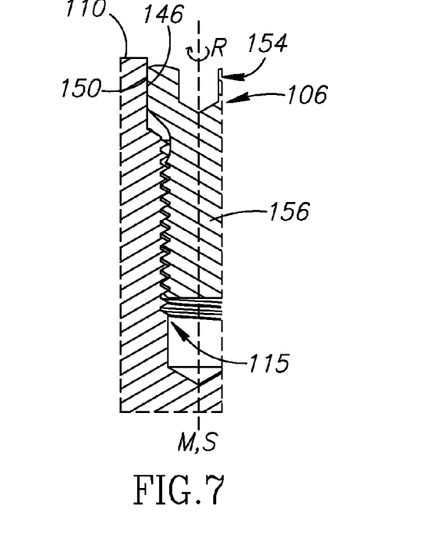
FIG. 7 is a cross sectional view of the cutting tool assembly of FIG. 6, according to the line VII-VII.

The tool head fastening member 106 is then fitted into the holder clamping portion 112, such that the screw axis S coincides with the clamping axis M, and the threading portion 156 threadingly engages the threaded bore 115. The tool head fastening member 106 is screwed into the holder clamping portion 112, by rotating in a screw direction R about the screw axis S (FIGS. 6 and 7), until the head clamping surface 148 presses against, and applies a clamping force F1, perpendicularly on the clamping surface 126 of the tool head 104. The circular shape of the head portion 154 conforms to the circular arc 158 formed by the holder support surfaces 146 (as indicated in FIGS. 5 and 6). Thus, the fastening support surface 150 slides, with friction, along the holder support surfaces 146 of the tool holder 102. Thus, since there is no direct pressure or force applied on the fastening support surface 150, the tool head fastening member 106 does not incur bending forces, and is more resilient to breakage, while keeping the cutting tool assembly 100 in the assembled position.

The cross section view of FIG. 8 is taken perpendicular to a plane including both the holder axis H and the clamping axis M. In this view, the clamping surface 126 is angled by an acute clamping angle φ relative to the tool head mating surface 134. Thus, the clamping force F1 applied perpendicularly on the clamping surface 126 by the screw head clamping surface 148, includes a downward force component, urging the tool head 104 to be tightened in the downward direction D.

In the assembled position, the tool head mating sidewalls 138 firmly abut the holder mating sidewalls 140 in a dovetail manner, and so the tool head mating surface 132 forms a dovetail connection with the holder mating surface 114. Further, the tool head abutment surface 135 firmly abuts the holder abutment surfaces 144. The dovetail connection and the external clamping of the tool head 104 by the tool head fastening member 106 are the only means for retaining the tool head 104 on the tool holder 102. The angled dovetail structure of the mating sidewalls 138, 140 prevents the tool head 104 from being pulled out of the tool holder 102, for example, by a mere upward or forward force. Thus, the tool head 104 is firmly retained in the tool holder 102, withstanding various operational forces (e.g., longitudinal, radial or lateral forces), without moving, shaking or being pulled out of the tool holder 102.

Further in the assembled position, the cutting tool assembly 100 may be provided with the cutting insert 162 in the insert pocket 130 of the tool head 104, and then employed in metal cutting operations. The cutting insert 162 may be retained within the insert pocket 130 prior to assembly of the tool head 104 onto the tool holder 102, since the mounting of the tool head 104 to the tool holder 102 does not involve contact with the insert pocket 130. As explained herein, assembling the cutting tool assembly 100 involves only contact with the rearward surface 122 and the bottom end 131 of the tool head 104. Alternatively, the cutting insert 162 may be retained within the insert pocket 130 after assembly of the tool head 104 onto the tool holder 102, since a clamping arrangement thereof would not involve contact with the rearward surface 122 or the bottom end 131 of the tool head 104.

It is noted that the tool head 104 may include any type of clamping arrangement for retaining the cutting insert 162. For example, the tool head 104 may include an insert clamping recess 160 extending generally downwards from the insert pocket 130 for receiving a clamping pin for contacting the cutting insert 162 and attaching it to the insert pocket 130. The tool head 104 may further include a forward recess screw 164 for engaging and pressing against the clamping pin.

The removable tool head 104 has a substantially rectangular chest form, having a tool head length L and a tool head width W (indicated in FIG. 2). The tool head width W extends across the tool head front surface 120. It should be appreciated, that in the cutting tool assembly 100, the removable tool head 104 is coupled to the tool holder 102 only by external clamping (i.e., pressing on an external surface thereof), and without having a clamping member pass through the body of the tool head 104. Thus, it is not required to make a through hole in the tool head 104 (i.e., a hole entirely surrounded by the body of the tool head 104), to enable coupling thereof to the tool holder 102.

This external clamping structure presents an advantage to the cutting tool assembly 100, in particular for a tool head 104 with small dimensions of the tool head length and width L, W, which would limit the available space for making a through hole in the tool head 104, however with sufficient space for forming the external clamping recess 124, as described herein above. In another example case, if the insert pocket 130 of the tool head 104 includes an insert clamping recess 160 for receiving a clamping pin or a fastening screw for clamping the cutting insert, this may limit the available space for making another through-hole in the tool head 104. Thus, it would be advantageous to externally clamp the tool head 104 to the tool holder 102, rather than by a through-hole clamping.

Figure 11:
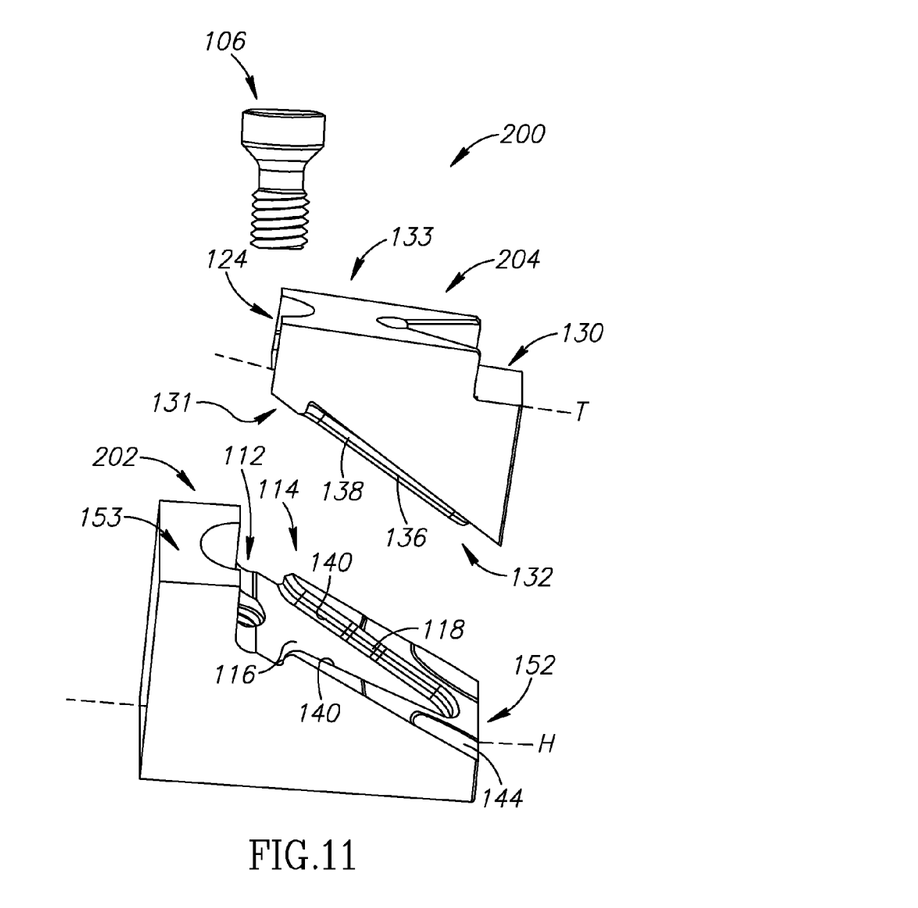
FIG. 11 is a perspective view of a cutting tool assembly according to another embodiment of the present invention, in a disassembled position.
Figure 12:
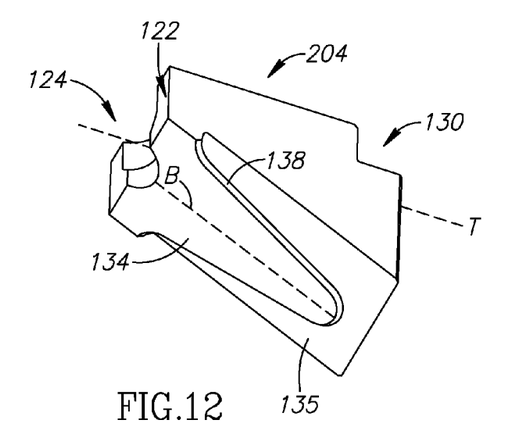
FIG. 12 is a bottom perspective view of the tool head of the cutting tool assembly of FIG. 11.
Figure 13:
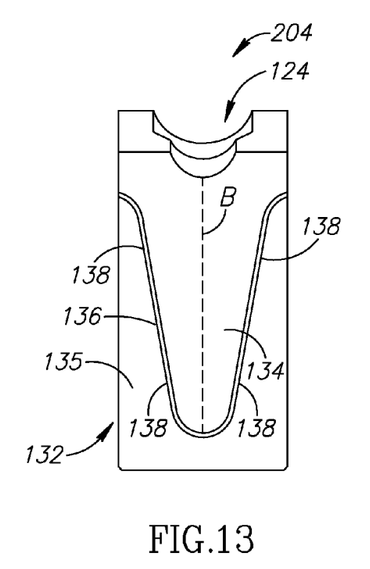
FIG. 13 is a bottom plan view of the head mating surface of the tool head of FIG. 12.
Figure 14:
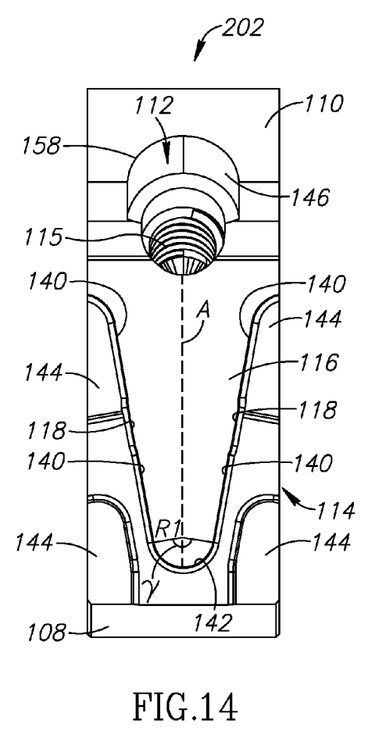
FIG. 14 is a plan view of the holder mating surface of the tool holder of the cutting tool assembly of FIG. 11.

Reference is now made to FIGS. 11-14. FIG. 11 depicts a cutting tool assembly 200, according to another embodiment of the disclosed technique, including a removable tool head 204, a tool holder 202, and a tool head fastening member 106. FIG. 12 depicts a perspective view of the tool head 204, and FIGS. 13 and 14 depict respective plan views of the tool head and holder mating surfaces 132, 114. Each of the unitary tool head and holder sidewalls 136, 118 generally forms a V-shape, in the plan view of the respective mating surface 132, 114. The V-shapes of the unitary tool head and holder sidewalls 136, 118 open out (i.e., diverge) towards the tool head and holder clamping recesses 124, 112, respectively.

Reference is now made to FIGS. 15-18, depicting a cutting tool assembly 300, according to yet another embodiment of the disclosed invention. The cutting tool assembly 300 includes a tool holder 302, a removable tool head 304 and a tool head fastening member 106. The holder 302 includes a holder mating surface 314, having a male portion 306 projecting therefrom, and the tool head 304 includes a tool head mating surface 316, having a beveled female portion 308.

Figure 15:
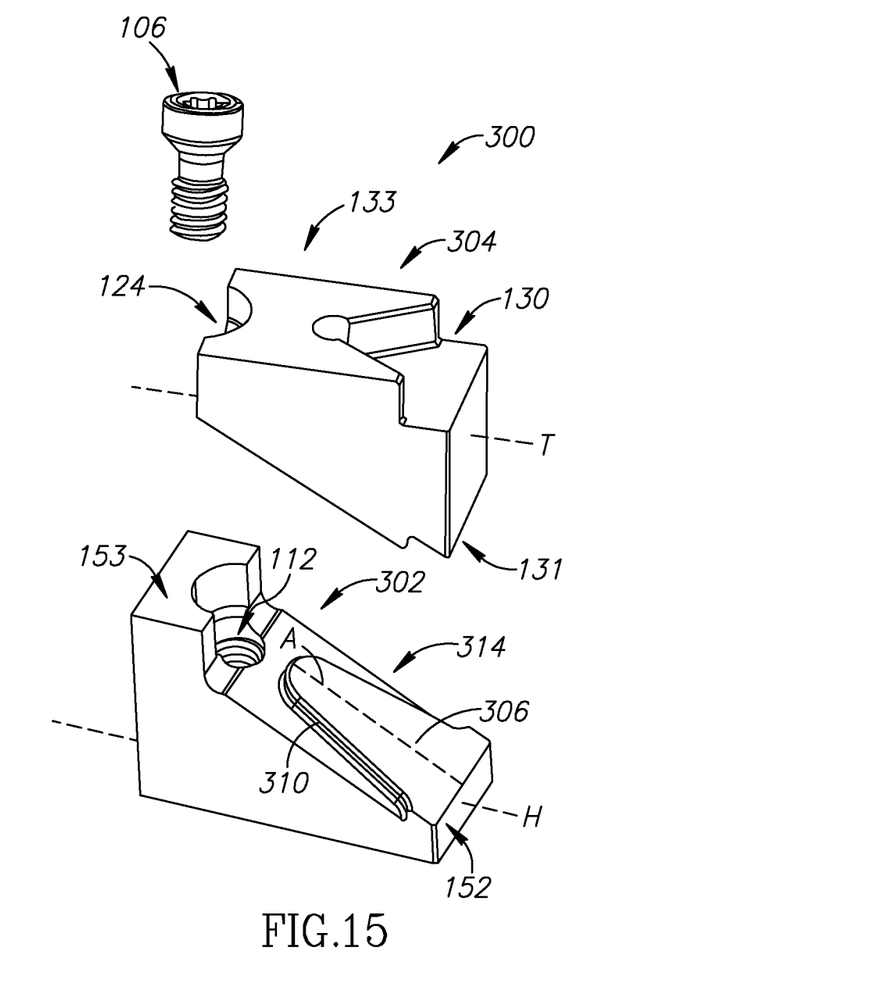
FIG. 15 is a perspective view of a cutting tool assembly according to yet another embodiment of the present invention, in a disassembled position.
Figure 16:
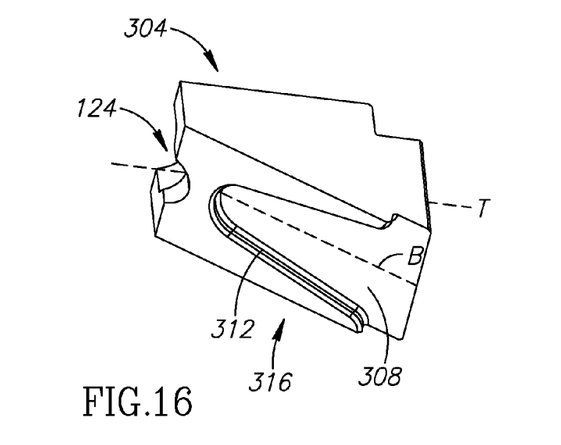
FIG. 16 is a bottom perspective view of the tool head of the cutting tool assembly of FIG. 15.
Figure 17:
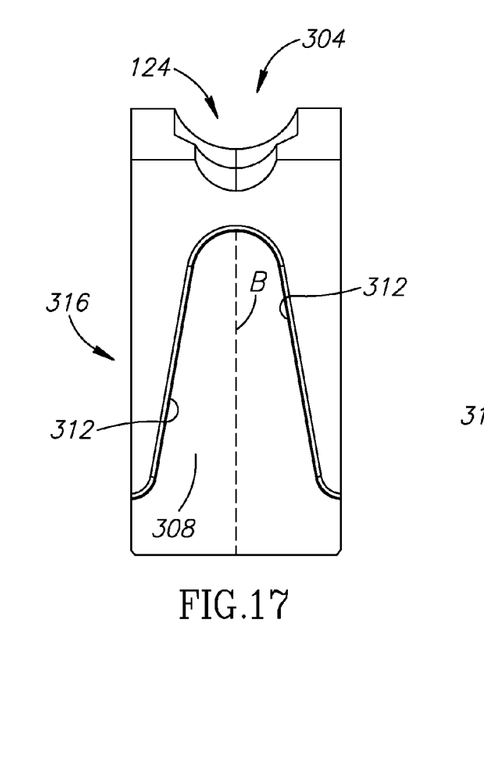
FIG. 17 is a bottom plan view of the head mating surface of the tool head of FIG. 16.
Figure 18:
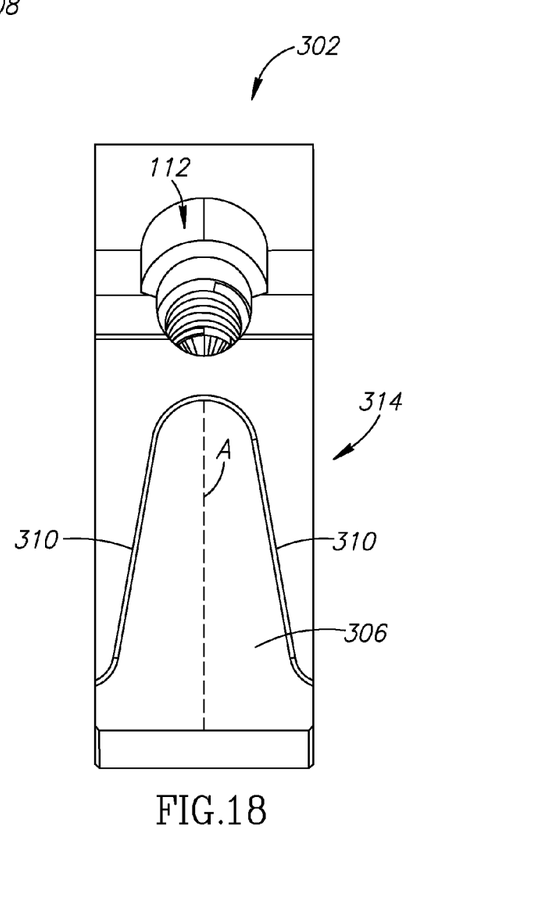
FIG. 18 is a plan view of the holder mating surface of the tool holder of the cutting tool assembly of FIG. 15.

Moving the cutting tool assembly 300 from the disassembled position to the assembled position is as described herein above with regards to the cutting tool assembly 100. In the assembled position, the holder's male portion 306 is received within the tool head's female portion 308, in a dovetail connection.

The holder mating surface 314 includes a plurality of holder mating sidewalls 310, which partially limit the male portion 306. The tool head mating surface 316 includes a plurality of tool head mating sidewalls 312, which partially limit the female portion 308, and are formed to abut the holder mating sidewalls 310 in a dovetail connection, when in the assembled position. The holder and tool head mating sidewalls 310, 312 diverge in the forward direction, in order to form a forward fit between the mating surfaces 314, 316 under the force applied by the tool head fastening member 106 on the tool head clamping recess 124 (as opposed to diverging towards the clamping recesses 112, 124, as in the cutting tool assemblies 100, 200).

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool assembly (100, 200, 300), comprising:
   a tool holder (102, 202, 302) having a longitudinal holder axis (H) extending in a rearward to forward direction ($D_R$, $D_F$), the tool holder (102, 202, 302) including a holder front end (152), a holder top end (153), a holder mating surface (114, 314) extending therebetween, and a holder clamping portion (112) spaced apart in the rearward direction ($D_R$) from the holder mating surface (114, 314);
   a tool head (104, 204, 304) having a longitudinal tool head axis (T) extending in the rearward to forward direction ($D_R$, $D_F$), and including a tool head bottom end (131) provided with a tool head mating surface (132, 316), and a tool head clamping recess (124) extending upwards from the tool head bottom end (131), and spaced apart in the rearward direction ($D_R$) from the tool head mating surface (132, 316); and
   a tool head fastening member (106), wherein in an assembled position of the cutting tool assembly (100, 200, 300):
   the tool head mating surface (132, 316) forms a dovetail connection with the holder mating surface (114, 314); and
   the tool head fastening member (106) clamps the tool head clamping recess (124), thereby externally clamping the tool head (104, 204, 304) to the tool holder (102, 202, 302).

2. The cutting tool assembly (100, 200, 300) of claim 1, wherein the holder mating surface (114, 314) and the tool head mating surface (132, 316) are tilted by a tilt angle (δ) relative to the holder and tool head axes (H, T), respectively.

3. The cutting tool assembly (100, 200, 300) of claim 2, wherein the tilt angle (δ) is an acute angle in the range of 0-60°.

4. The cutting tool assembly (100, 200, 300) of claim 1, wherein the holder mating surface (114, 314) includes a plurality of holder mating sidewalls (140, 310), and the tool head mating surface (132, 316) includes a plurality of tool head mating sidewalls (138, 312) conforming to the holder mating sidewalls (140, 310).

5. The cutting tool assembly (100, 200, 300) of claim 1, wherein the tool head clamping recess (124) includes a clamping surface (126), and the tool head fastening member (106) is pressed against the clamping surface (126).

6. The cutting tool assembly (100, 200, 300) of claim 1, wherein the holder clamping portion (112) has at least one holder support surface (146), and the tool head fastening member (106) slides, with friction, along the at least one holder support surface (146).

7. The cutting tool assembly (100, 200, 300) of claim 6, wherein the holder clamping portion (112) has two support surfaces (146), separated by a release recess (147).

8. The cutting tool assembly (100, 200, 300) of claim 6, wherein the at least one support surface (146) lies on a substantially circular arc (158).

9. The cutting tool assembly (100, 200, 300) of claim 1, wherein:
   the holder clamping portion (112) extends along a clamping axis (M), and
   the clamping axis (M) and the tool head recess (124) are substantially perpendicular to the holder axis (H) and the tool head axis (T), respectively.

10. The cutting tool assembly (100, 200, 300) of claim 1, wherein the tool head (104, 204, 304) has a tool head top end (133) provided with an insert pocket (130) for holding a cutting insert (162).

11. The cutting tool assembly (100, 200, 300) of claim 4, wherein in a respective plan view of the holder mating surfaces (114, 314) and the tool head mating surface (132, 316), the holder mating sidewalls (140, 310) and the tool head mating sidewalls (138, 312) exhibit mirror symmetry relative to a holder mating axis (A) and a tool head mating axis (B), respectively.

12. The cutting tool assembly (100, 200, 300) of claim 4, wherein in a respective plan view of the holder mating surfaces (114, 314) and the tool head mating surface (132, 316), the holder mating sidewalls (140, 310) and the tool head mating sidewalls (138, 312) are substantially linear.

13. The cutting tool assembly (100, 200) of claim 4, wherein:
   the holder mating surface (114) includes a female portion (116) partially limited by the holder mating sidewalls (140), and
   the tool head mating surface (132) includes a male portion (134) partially limited by the tool head mating sidewalls (138).

14. The cutting tool assembly (100, 200) of claim 13, wherein:
   the female portion (116) forms an acute holder dovetail angle (α) with the holder mating sidewalls (140), and
   the male portion (134) forms an acute tool head dovetail angle (β) with the tool head mating sidewalls (138).

15. The cutting tool assembly (100, 200) of claim 13, wherein:
   the tool head (104) includes a tool head abutment surface (135), substantially parallel to the male portion (134) and spaced apart therefrom by a first distance (H1), and
   the holder (102) includes at least three coplanar holder abutment surfaces (144) substantially parallel to the female portion (116), and spaced apart therefrom by a second distance (H2), which is the same as, or greater than the first distance (H1).

16. The cutting tool assembly (300) of claim 4, wherein:
   the holder mating surface (314) includes a male portion (306) partially limited by the holder mating sidewalls (310), and the tool head mating surface (316) includes a female portion (308) partially limited by the tool head mating sidewalls (312).

17. The cutting tool assembly (100, 200, 300) of claim 4, wherein the holder mating sidewalls (140, 310) are connected by a unitary holder sidewall (118).

18. The cutting tool assembly (100, 200) of claim 17, wherein the unitary holder sidewall (118) diverges towards the holder clamping portion (112).

19. The cutting tool assembly (100, 200) of claim 4, wherein the holder mating sidewalls (140) diverge towards the holder clamping portion (112).

20. The cutting tool assembly (100, 200, 300) of claim 4, wherein the tool head mating sidewalls (138, 312) are connected by a unitary tool head sidewall (136).

21. The cutting tool assembly (100, 200) of claim 20, wherein the unitary tool head sidewall (136) diverges towards the tool head clamping recess (124).

22. The cutting tool assembly (100, 200) of claim 4, wherein the tool head mating sidewalls (138) diverge towards the tool head clamping recess (124).

23. The cutting tool assembly (200) according to claim 4, wherein:
the holder mating sidewalls (140) are connected by a unitary holder sidewall (118), diverging towards the holder clamping portion (112);
the tool head mating sidewalls (138) are connected by a unitary tool head sidewall (136), diverging towards the tool head clamping recess (124); and
each of the unitary tool head and holder sidewalls (136, 118) forms a V-shape, when the tool head mating surface (132) and the holder mating surface (114) are viewed in a respective plan view.

24. The cutting tool assembly (100, 200, 300) of claim 1, wherein
the dovetail connection between the tool head mating surface (132, 316) and the holder mating surface (114, 314), and
the clamping of the tool head (104, 204, 304) by the tool head fastening member (106),
are the only means for retaining the tool head (104, 204, 304) on the tool holder (102, 202, 302).

25. A cutting tool (101) comprising the cutting tool assembly (100, 200, 300) of claim 1 in the assembled position, wherein:

the tool head top end (133) is provided with an insert pocket (130); and
a cutting insert (162) is retained in the insert pocket (130).

26. A tool head (104, 204, 304) having a longitudinal tool head axis (T) extending in the rearward to forward direction ($D_R$, $D_F$), and comprising:
a tool head top end (133) provided with an insert pocket (130);
a tool head bottom end (131) provided with a tool head mating surface (132, 316) including a plurality of tool head mating sidewalls (138, 312); and
a tool head rearward surface (122) provided with a tool head clamping recess (124) which extends upwards from the tool head bottom end (131) to the tool head top end (133) and is spaced apart in the rearward of the tool head mating surface (132, 316); wherein:
the tool head mating surface (132, 316) is tilted by a tilt angle (δ) relative to tool head axis (T).

27. The tool head (104, 204) of claim 26, wherein:
the tool head mating surface (132) includes a male portion (134) partially limited by the tool head mating sidewalls (138); and
the male portion (134) forms an acute tool head dovetail angle (β) with the tool head mating sidewalls (138).

28. The tool head (104) of claim 26, wherein the tool head (104) includes a tool head abutment surface (135), substantially parallel to the male portion (134) and spaced apart therefrom by a first distance (H1).

29. The tool head (304) of claim 26, wherein the tool head mating surface (316) includes a female portion (308) partially limited by the tool head mating sidewalls (312).

30. The tool head (104, 204, 304) of claim 26, wherein the tool head mating sidewalls (138, 312) are connected by a unitary tool head sidewall (136).

31. The tool head (104, 204) of claim 30, wherein the unitary tool head sidewall (136) diverges towards the tool head clamping recess (124).

32. The tool head (104, 204, 304) of claim 30, wherein each of the unitary tool head sidewalls (136) forms a V-shape, when the tool head mating surface (132, 316) is viewed in a plan view.

33. The tool head (104, 204) of claim 26, wherein the tool head mating sidewalls (138) diverge towards the tool head clamping recess (124).

* * * * *